(12) United States Patent
Kilchyk

(10) Patent No.: US 12,704,332 B2
(45) Date of Patent: Aug. 11, 2026

(54) SMART ADDITIVELY MANUFACTURED HEAT EXCHANGER WITH ADAPTIVE PROFILE AND TURBULATOR

(71) Applicant: Hamilton Sundstrand Corporation, Charlotte, NC (US)

(72) Inventor: Viktor Kilchyk, Lancaster, NY (US)

(73) Assignee: Hamilton Sundstrand Corporation, Charlotte, NC (US)

(*) Notice: Subject to any disclaimer, the term of this patent is extended or adjusted under 35 U.S.C. 154(b) by 1017 days.

(21) Appl. No.: 17/587,619

(22) Filed: Jan. 28, 2022

(65) Prior Publication Data

US 2023/0243605 A1 Aug. 3, 2023

(51) Int. Cl.

| | |
|---|---|
| ***F28F 13/12*** | (2006.01) |
| ***B64D 13/08*** | (2006.01) |
| ***F28D 21/00*** | (2006.01) |
| ***F28F 1/24*** | (2006.01) |
| ***F28F 13/08*** | (2006.01) |
| ***F28F 21/08*** | (2006.01) |

(52) U.S. Cl.

CPC .............. *F28F 13/12* (2013.01); *B64D 13/08* (2013.01); *F28F 1/24* (2013.01); *F28F 13/08* (2013.01); *F28F 21/081* (2013.01); *F05D 2260/213* (2013.01); *F05D 2300/505* (2013.01); *F28D 2021/0026* (2013.01); *F28F 2250/02* (2013.01); *F28F 2255/04* (2013.01)

(58) Field of Classification Search

CPC ............... B64D 13/08; F05D 2260/213; F05D 2300/505; F28D 2021/0026; F28F 13/12; F28F 1/24; F28F 13/08; F28F 21/081; F28F 2250/02; F28F 2255/04

USPC .................................................. 165/276, 277

See application file for complete search history.

(56) References Cited

U.S. PATENT DOCUMENTS 3,463,224 A * 8/1969 Myers ...................... B64G 1/50 165/277
4,676,300 A * 6/1987 Miyazaki ................ B64G 1/50 165/277

(Continued)

FOREIGN PATENT DOCUMENTS

EP 2043148 A2 * 4/2009 .......... H10W 40/226
EP 2899486 A1 * 7/2015 ............ F28D 21/00

(Continued)

OTHER PUBLICATIONS

Communication Pursuant to Article 94(3) EPC for EP Application No. 23152948.8, dated Nov. 21, 2024, 5 pages.

(Continued)

*Primary Examiner* — Ljiljana V. Ciric
(74) *Attorney, Agent, or Firm* — Kinney & Lange, P.A.

(57) ABSTRACT

A heat exchanger element includes a body and at least one deformable surface feature disposed at an outer body surface of the body. At least one of the body and of the at least one surface feature is configured to selectively respond to a temperature change such that a physical characteristic of the heat exchanger element changes in response to the temperature change. The physical characteristic is selected from the group consisting of: a shape of the heat exchanger element, a surface area of the heat exchanger element, a surface roughness of the heat exchanger element, and combinations thereof.

19 Claims, 7 Drawing Sheets

(56) References Cited

U.S. PATENT DOCUMENTS 5,535,820 A * 7/1996 Beagle ........ F28F 1/32 29/890.047
6,330,157 B1 * 12/2001 Bezama ........ H01L 23/473 361/689
7,743,763 B2 * 6/2010 Grip ........ H10F 77/63 136/246
7,752,866 B2 * 7/2010 Vaidyanathan ........ B64G 1/50 337/393
7,926,471 B2 4/2011 Freese
9,025,333 B1 * 5/2015 Spowart ........ B64G 1/50 62/383
9,239,195 B2 * 1/2016 Kim ........ F28D 9/0093
9,404,692 B2 * 8/2016 Grayson ........ F28F 13/00
9,603,288 B2 * 3/2017 Kwak ........ H05K 7/20454
9,879,924 B2 * 1/2018 Quinn ........ F28D 21/00
9,952,006 B2 * 4/2018 Barron ........ H01F 7/06
9,982,661 B1 * 5/2018 Trigwell ........ F03G 7/06145
10,557,671 B2 * 2/2020 Mironets ........ F28F 3/027
10,739,086 B2 8/2020 Aquizerate et al.
10,852,080 B2 * 12/2020 Im ........ G05B 15/02
11,031,312 B2 * 6/2021 Poltorak ........ H05K 7/20154
11,067,345 B2 * 7/2021 Francis ........ B64G 1/2225
11,204,206 B2 * 12/2021 Busche ........ H05K 7/2039
11,248,526 B2 * 2/2022 Tajiri ........ F28F 7/02
11,346,620 B2 * 5/2022 Poltorak ........ H05K 7/20418
11,426,818 B2 * 8/2022 Schiffres ........ B32B 15/01
11,598,440 B2 * 3/2023 Mastrocola ........ F28D 1/0477
11,670,564 B2 * 6/2023 Poltorak ........ H05K 7/20154 165/281
11,737,649 B2 * 8/2023 Heni ........ A61B 1/05 600/109
11,913,737 B2 * 2/2024 Poltorak ........ F28G 1/16
12,122,120 B2 * 10/2024 Schiffres ........ B33Y 10/00
12,123,654 B2 * 10/2024 Poltorak ........ F28F 13/12
12,288,731 B2 * 4/2025 Poltorak ........ H01L 23/473
12,339,078 B2 * 6/2025 Poltorak ........ F28G 13/00
2005/0063159 A1 * 3/2005 Ma ........ F28F 3/02 257/E23.099
2009/0025712 A1 * 1/2009 Grip ........ H10F 77/63 126/704
2009/0050293 A1 * 2/2009 Kuo ........ H10W 40/22 165/80.3
2009/0052138 A1 * 2/2009 Kuo ........ H10W 40/22 165/185
2010/0236596 A1 * 9/2010 Lee ........ C04B 35/547 136/238
2011/0174462 A1 * 7/2011 Arik ........ F28F 3/022 165/96
2016/0209132 A1 * 7/2016 Mironets ........ F28F 3/022
2018/0017345 A1 * 1/2018 Poltorak ........ F28G 1/16
2018/0058472 A1 * 3/2018 Tajiri ........ F28F 3/12
2019/0120557 A1 * 4/2019 Nagano ........ F28F 1/32
2019/0195132 A1 6/2019 Tajiri et al.
2021/0354552 A1 11/2021 Jeong
2023/0243605 A1 * 8/2023 Kilchyk ........ F28F 13/12 165/96
2025/0044036 A1 * 2/2025 Poltorak ........ F28F 3/02

FOREIGN PATENT DOCUMENTS

EP 3800415 A1 * 4/2021 ........ F16K 49/00
KR 101349013 B1 * 1/2014 ........ H01M 10/6551
WO WO-2018013668 A1 * 1/2018 ........ F28G 9/00
WO WO-2018185410 A1 * 10/2018 ........ F28F 13/12

OTHER PUBLICATIONS

Extended European Search Report for EP Application No. 23152948.8, dated Jun. 15, 2023, 8 pages.

* cited by examiner

SMART ADDITIVELY MANUFACTURED HEAT EXCHANGER WITH ADAPTIVE PROFILE AND TURBULATOR

BACKGROUND

The present disclosure relates generally to heat exchangers, and in particular to an additively manufactured heat exchanger for an aircraft.

It is desirable to optimize a heat exchanger based on operating conditions to increase heat exchange efficiency. However, heat exchangers in aircraft experience a wide range of operating conditions and are subject to weight and pressure drop constraints.

SUMMARY

According to one aspect of the present invention, a heat exchanger element includes a body and at least one surface feature disposed at an outer body surface of the body. The at least one surface feature is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof.

According to another aspect of the present invention, a heat exchanger for an aircraft includes at least one heat exchanger element and at least one header. The at least one heat exchanger element includes a body and at least one surface feature disposed at an outer body surface of the body. The at least one surface feature is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof. The at least one header is attached to an end of the at least one heat exchanger element such that the at least one header is oriented perpendicular to the at least one heat exchanger element.

According to yet another aspect of the present invention, a method of manufacturing a heat exchanger for an aircraft includes additively manufacturing at least one heat exchanger element and manufacturing at least one header which is attached to an end of the at least one heat exchanger element. The at least one heat exchanger element includes a body and at least one surface feature which is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way.

DETAILED DESCRIPTION

Surface features of a heat exchanger element are designed to vary their shape in response to a temperature difference or gradient. As a result of this shape variance, the heat exchanger element can change its surface shape, surface area, surface roughness, and/or other surface characteristics. This allows the heat exchanger to improve its performance across a wide range of operating conditions (as compared to a conventional heat exchanger).

As used in the present disclosure, a "temperature change" can also refer to a change in relative temperature or other temperature gradient change.

Figure 1:
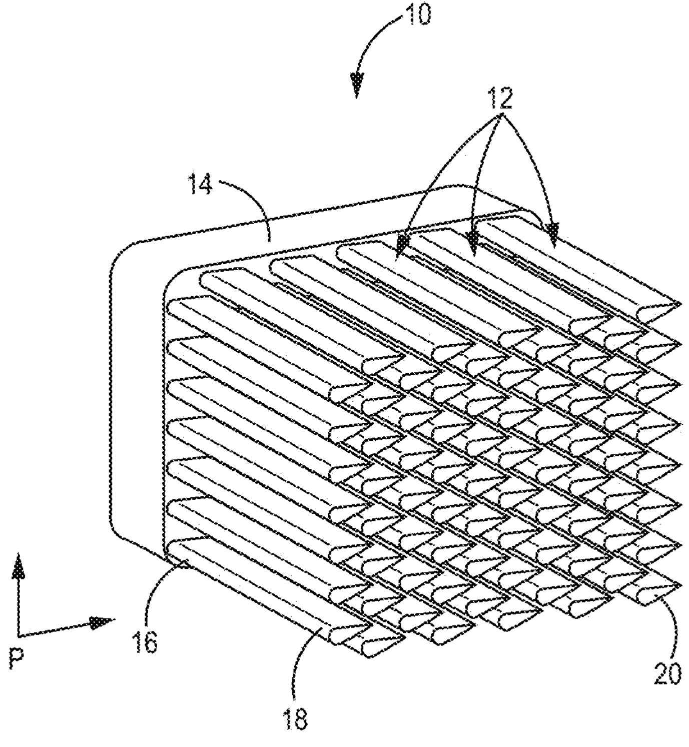
FIG. 1 is a perspective view of a prior art heat exchanger including uniform, airfoil-shaped heat exchanger elements.

FIG. 1 is a perspective view of prior art heat exchanger 10. Prior art heat exchanger 10 includes heat exchanger elements 12 and header 14. Each heat exchanger element 12 has a first end 16, a second end 18, and a cross-section 20. Each cross-section 20 is parallel to cross-sectional plane P.

In the example depicted in FIG. 1, prior art heat exchanger 10 is a cross-flow heat exchanger designed for use in an aircraft. Heat exchanger elements 12 have a uniform shape and size. In the example depicted in FIG. 1, each heat exchanger element 12 is a tube having a teardrop-shaped cross-section 20. Each first end 16 of a heat exchanger element 12 is attached to header 14, and each second end 18 of a heat exchanger element 12 extends away from header 14. Each heat exchanger element 12 is thereby arranged perpendicular to header 14, and header 14 is parallel to cross-sectional plane P.

An ideal heat exchanger would achieve the highest efficiency possible for heat exchange. Generally, surface area and flow turbulence are positively correlated with efficiency of heat exchange. However, heat exchangers for aircraft (such as prior art heat exchanger 10) also have weight and pressure drop constraints, and are used in a variety of operating conditions. These heat exchangers need to operate at a wide range of temperatures/temperature gradients, altitudes, flow rates, and other parameters. Heat exchangers such as prior art heat exchanger 10 are generally designed to operate across these wide ranges, but are not optimized for any particular operating condition within those ranges. As a result, the efficiency of prior art heat exchanger 10 may be quite low in some circumstances (such as when a temperature gradient decreases within an aircraft component).

Figure 2A:
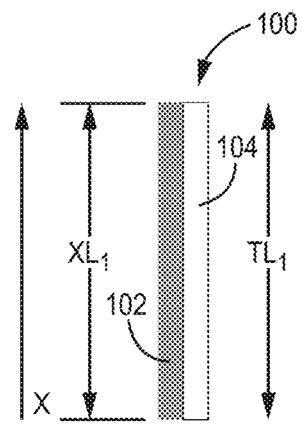
FIG. 2A is a schematic depiction of a bi-material element, each material having a different thermal expansion coefficient.
Figure 2B:
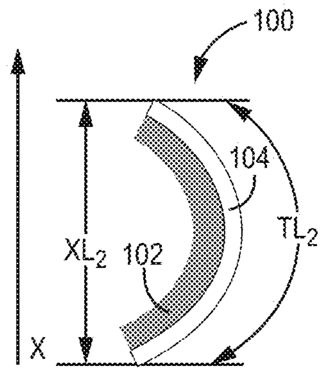
FIG. 2B is a schematic depiction of the bi-material element of FIG. 2A after a temperature increase.
Figure 2C:
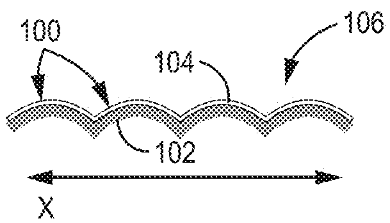
FIG. 2C is a schematic depiction of a series of the bi-material elements of FIG. 2A after a temperature increase.

FIG. 2A is a schematic depiction of bi-material element 100. Bi-material element 100 includes first material 102 and second material 104. FIG. 2B is a schematic depiction of bi-material element 100 after a temperature increase. FIG. 2C is a schematic depiction of series 106 of bi-material elements 100 after a temperature increase. FIGS. 2A-2C will be discussed in turn below.

As shown in FIG. 2A, bi-material element 100 has initial total length $TL_1$. Bi-material element 100 also has an initial length along the x-axis $XL_1$. $TL_1$ is equal to $XL_1$ in FIG. 2A because bi-material element 100 is not curved. Both first material 102 and second material 104 can be metallic, such that first material 102 is a first metal and second material 104 is a second metal. First material 102 has a first thermal expansion coefficient (TEC) $C_1$. Second material 104 has a second TEC $C_2$ which is different than first TEC $C_1$. In the depicted example, second TEC $C_2$ is greater than first TEC $C_1$.

After bi-material element 100 has experienced a temperature increase, as shown in FIG. 2B, bi-material element 100 has final total length $TL_2$ and a final length along the x-axis $XL_2$ such that:

$$TL_1 < TL_2$$

$$XL_1 > XL_2$$

In FIG. 2B, the total length of bi-material element 100 has increased due to thermal expansion of both first material 102 and second material 104. However, because first TEC $C_1$ is less than second TEC $C_2$, first material 102 expands less than second material 104 during the temperature increase. Due to this uneven expansion between first material 102 and second material 104, the curvature of bi-material element 100 has increased and the length of bi-material element 100 along the x-axis has decreased. It should be understood that a discrete boundary between first material 102 and second material 104 is shown in FIGS. 2A-2C, but embodiments of a bi-material element without a discrete boundary are possible through the use of additive manufacturing. Additionally, while final length $XL_2$ is shown as less than $XL_1$ in FIGS. 2A-2B, in other embodiments the length of bi-material element 100 along the x-axis can remain the same (depending on choice of materials, temperature, and other parameters).

As shown in FIG. 2C, bi-material elements 100 can be arranged in series 106. FIG. 2C shows bi-material elements 100 arranged end-to-end, but it should be understood that bi-material elements 100 can be staggered, arranged in a lattice structure, or otherwise arranged in a pattern. Additionally, the layout of series 106 can include varying orientations of bi-material elements 100 and/or bi-material elements 100 containing different materials (through the use of, for example, a third material). Bi-material elements 100 can be incorporated into the internal structure of a heat exchanger element using additive manufacturing. As bi-material elements 100 change in length due to a temperature increase, series 106 will correspondingly change in length (both total length and length along the x-axis). It should be understood that the use of more or less than two materials can also achieve similar results as a bi-material element (for example, a tri-material element with at least one material having a different TEC than the other two materials, other embodiments of multi-metallic elements, or an element made of a shape-memory alloy).

Figure 3A:
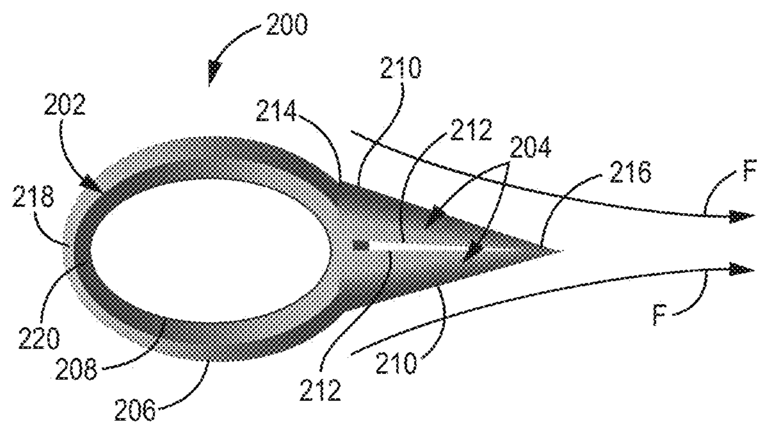
FIG. 3A is a cross-sectional view of a heat exchanger element having a variable surface shape.
Figure 3B:
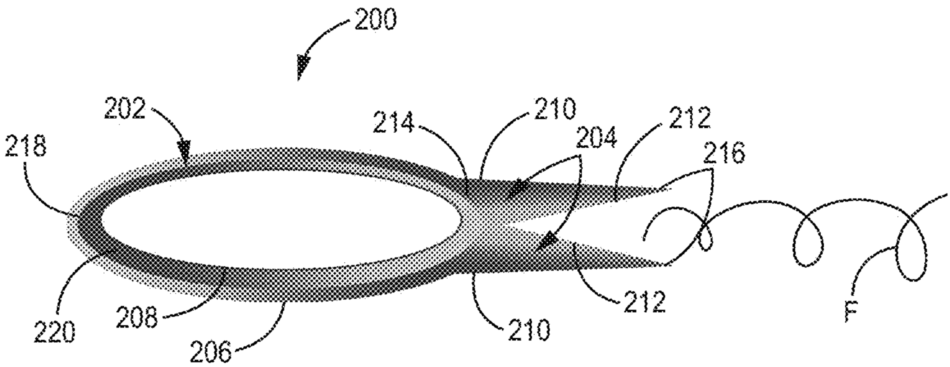
FIG. 3B is a cross-sectional view of the heat exchanger element of FIG. 3A after a temperature change.

FIG. 3A is a cross-sectional view of heat exchanger element 200. Heat exchanger element 200 includes body 202 and tail fins 204. Body 202 has an outer body surface 206 and an inner body surface 208. Tail fins 204 each have an outer fin surface 210, an inner fin surface 212, a base 214, and a tip 216. Arrows F show the direction of a fluid flow about heat exchanger element 200. FIG. 3B is a cross-sectional view of heat exchanger element 200 after a temperature change. FIGS. 3A-3B will be discussed in turn below.

Heat exchanger element 200 can include surface features, such as tail fins 204. In the example shown in FIG. 3A, body 202 and tail fins 204 are each formed of a first material 218 and a second material 220. In the depicted example, outer body surface 206 and inner body surface 208 are each formed of approximately half first material 218 and half second material 220, outer fin surfaces 210 are formed of first material 218, and inner fin surfaces 212 are formed of second material 220. The precise location of first material 218 and second material 220 within body 202 and/or tail fins 204 can be selected to achieve a particular shape variance and/or tail fin position variance. First material 218 has a first TEC $C_1$, and second material 220 has a second TEC $C_2$. As described above in reference to FIGS. 2A-2C, first TEC $C_1$ is different than second TEC $C_2$, and in some examples first TEC $C_1$ is less than second TEC $C_2$.

First material 218 and second material 220 can operate in substantially the same way as first material 102 and second material 104 (described above in reference to FIGS. 2A-2C). Due to the difference in thermal expansion between first material 218 and second material 220, the shape of body 202 and the position of tail fins 204 can change based on temperature.

FIG. 3B shows heat exchanger element 200 following a temperature change. This temperature change can occur on one or both of outer body surface 206 and inner body surface 208 (i.e., in one or both fluids passing through the heat exchanger). In the illustrated embodiment, the shape of body 202 has become more elongated due to the difference in TEC of first material 218 and second material 220. Because outer fin surface 210 is formed of first material 218 and inner fin surface 212 is formed of second material 220, outer fin surface 210 expands less than inner fin surface 212 due to a temperature change. This difference in TEC causes the tips 216 of tail fins 204 to move away from each other in response to a temperature change. In some examples, a similar position change of tail fins 204 can be achieved by deforming the shape of body 202, provided that tail fins 204 are sufficiently coupled to outer body surface 206. In some examples, a shape-memory alloy can be used in place of first and second materials with differing TEC values. It should be understood that, depending on the choice of material(s) selected and the temperatures experienced, the shape of body 202 and the position of tail fins 204 can vary.

The shape variance of body 202 and the position of tail fins 204 can help to increase the turbulence of fluid flow through the heat exchanger during operation. This increase in turbulence can raise the efficiency of the heat exchanger due to the disruption of boundary layers along the walls of heat exchanger elements 200.

Figure 4A:
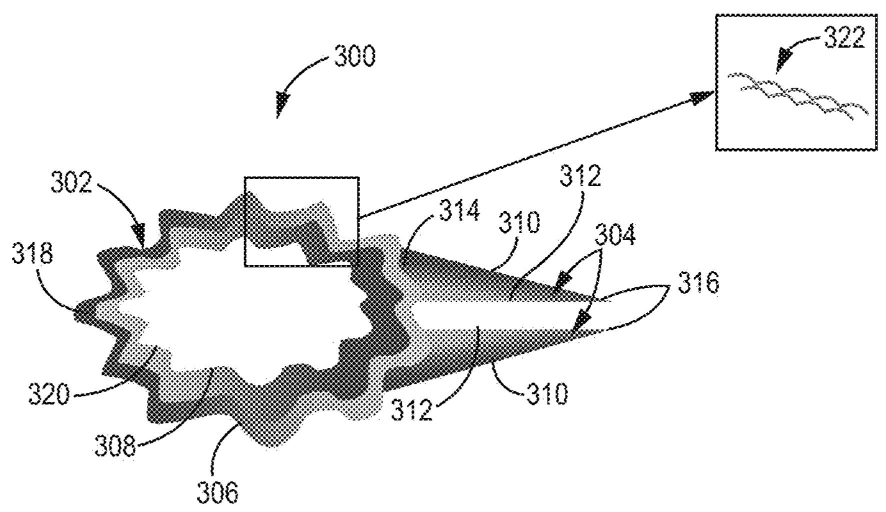
FIG. 4A is a cross-sectional view of a heat exchanger element having a variable surface area.
Figure 4B:
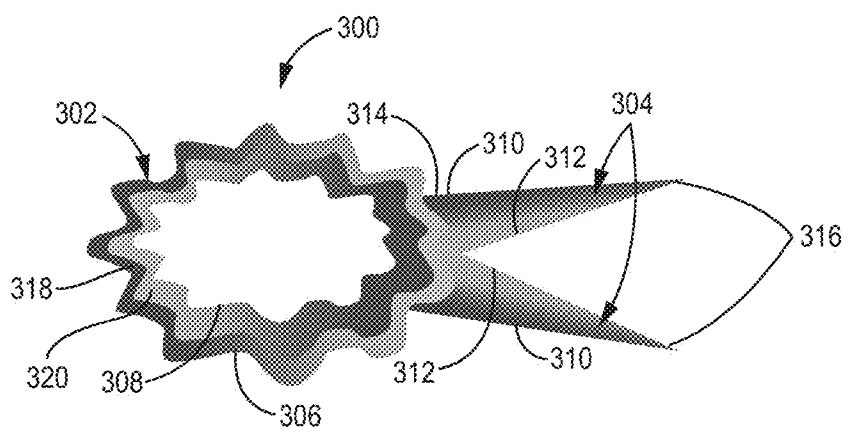
FIG. 4B is a cross-sectional view of the heat exchanger element of FIG. 4A after a temperature change.

FIG. 4A is a cross-sectional view of heat exchanger element 300. Heat exchanger element 300 includes body 302 and tail fins 304. Body 302 has an outer body surface 306 and an inner body surface 308. Tail fins 304 each have an outer fin surface 310, an inner fin surface 312, a base 314, and a tip 316. FIG. 4B is a cross-sectional view of heat exchanger element 300 after a temperature change. FIGS. 4A-4B will be discussed in turn below.

As described above in reference to FIGS. 3A-3B, heat exchanger element 300 can include surface features such as tail fins 304, and body 302 and tail fins 304 are each formed of a first material 318 and a second material 320. Tail fins 304 can be substantially similar to tail fins 204 (described above in reference to FIGS. 3A-3B). Body 302 can be formed of a series of bi-material elements, such as series 322. Series 322 can be substantially similar to series 106 (described above in reference to FIG. 2C). These bi-material elements can each be formed of first material 318 and second material 320. First material 318 has a first TEC $C_1$, and second material 320 has a second TEC $C_2$. As described above in reference to FIGS. 2A-2C, first TEC $C_1$ is different than second TEC $C_2$, and in some examples first TEC $C_1$ is less than second TEC $C_2$.

First material 318 and second material 320 can operate in substantially the same way as first material 102 and second material 104 (described above in reference to FIGS. 2A-2C). Due to the difference in thermal expansion between first material 318 and second material 320, the surface area of body 302 and the position of tail fins 304 can change based on temperature.

FIG. 4B shows heat exchanger element 300 following a temperature change. The surface area of body 302 has increased due to the difference in TEC of first material 318 and second material 320. Body 302 can thereby expand or contract based on temperature. In some examples, a shape-memory alloy can be used in place of first and second materials with differing TEC values. It should be understood that the surface area variance of body 302 can depend on the choice of material(s) and the temperatures experienced.

The surface area variance of body 302 can help to increase the amount of heat exchanged by heat exchanger element 300. Additionally, the position of tail fins 304 can help to increase the turbulence of fluid flow through the heat exchanger during operation (as described above in reference to FIGS. 3A-3B).

Figure 5A:
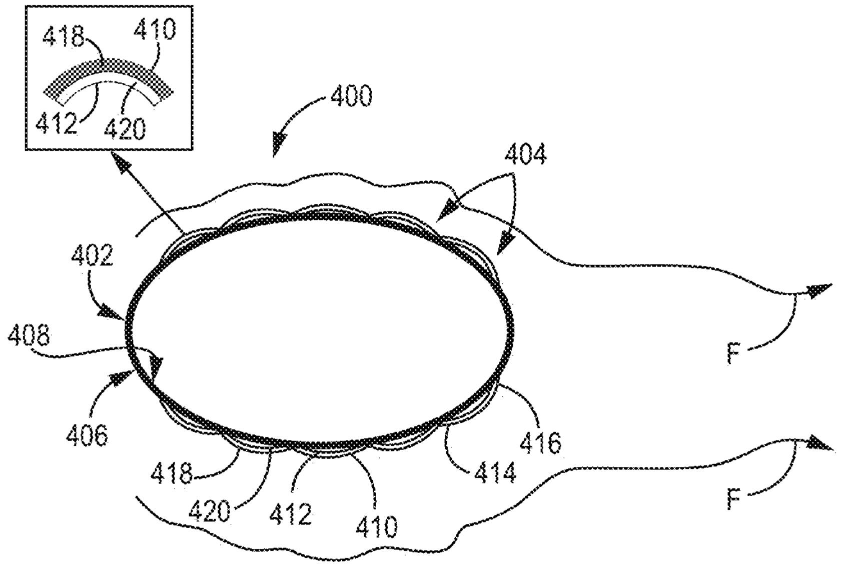
FIG. 5A is a cross-sectional view of a heat exchanger element having deformable surface features and a variable surface roughness.
Figure 5B:
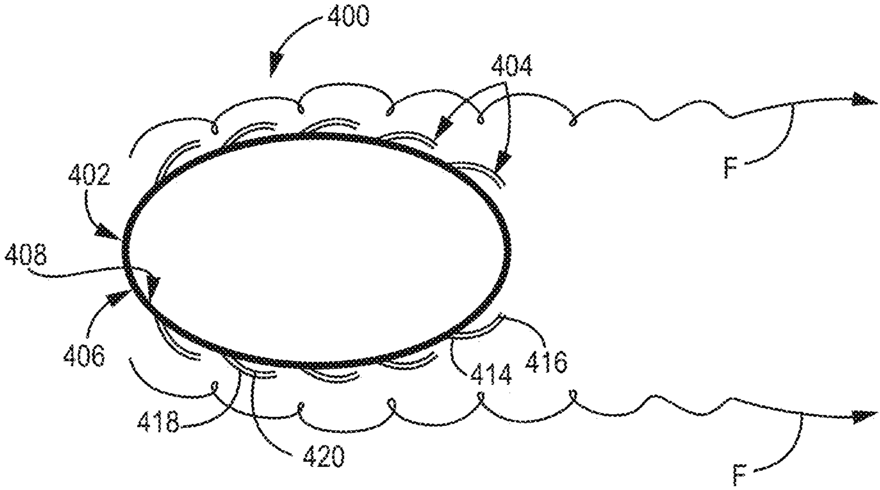
FIG. 5B is a cross-sectional view of the heat exchanger element of FIG. 5A after a temperature change.

FIG. 5A is a cross-sectional view of heat exchanger element 400. Heat exchanger element 400 includes body 402 and micro-fins 404. Body 402 has an outer body surface 406 and an inner body surface 408. Each micro-fin 404 has an outer fin surface 410, an inner fin surface 412, a first end 414, and a second end 416. Arrows F show the direction of a fluid flow about heat exchanger element 400. FIG. 5B is a cross-sectional view of heat exchanger element 400 after a temperature change. FIGS. 5A-5B will be discussed in turn below.

As described above in reference to FIGS. 3A-3B, heat exchanger element can include surface features such as micro-fins 404. Micro-fins 404 are illustrated as having a curved shape in FIGS. 5A-5B, but micro-fins 404 can have other shapes such as a substantially flat shape (either before or after a temperature change), a shape which conforms to outer body surface 406 (either before or after a temperature change), a straight fin similar to tail fins 204, 304 in FIGS. 3A-4B, or other suitable shapes. Each micro-fin 404 can be formed of a first material 418 and a second material 420. Each first end 414 of micro-fins 404 can be attached to outer body surface 406. Each second end 416 of micro-fins 404 can be a free end unattached to outer body surface 406. In FIG. 5A, each second end 416 of micro-fins 404 is located adjacent to outer body surface 406. Each micro-fin 404 can be formed of a bi-material element, similar to bi-material element 100 (described above in reference to FIG. 2C). These bi-material elements can each be formed of first material 418 and second material 420. Outer fin surface 410 can be formed of first material 418, and inner fin surface 412 can be formed of second material 420. First material 418 has a first TEC $C_1$, and second material 420 has a second TEC $C_2$. As described above in reference to FIGS. 2A-2C, first TEC $C_1$ is different than second TEC $C_2$, and in some examples first TEC $C_1$ is less than second TEC $C_2$.

First material 418 and second material 420 can operate in substantially the same way as first material 102 and second material 104 (described above in reference to FIGS. 2A-2C). Due to the difference in thermal expansion between first material 418 and second material 420, the position of micro-fins 404 can change based on temperature.

FIG. 5B shows heat exchanger element 400 following a temperature change. The position of micro-fins 404 has changed due to the difference in TEC of outer fin surface 410 and inner fin surface 412. Micro-fins 404 can thereby change position based on temperature, and this positioning changes the surface roughness of heat exchanger element 400. In some examples, a shape-memory alloy can be used in place of first and second materials with differing TEC values. It should be understood that the surface roughness variance of heat exchanger element 400 can depend on the choice of material(s) and the temperatures experienced.

In a similar manner to tail fins 204 and 304 (described above in reference to FIGS. 3A-4B), the surface roughness variance of heat exchanger element 400, caused by the movement of micro-fins 404, can help to increase the turbulence of fluid flow through the heat exchanger during operation.

Figure 6A:
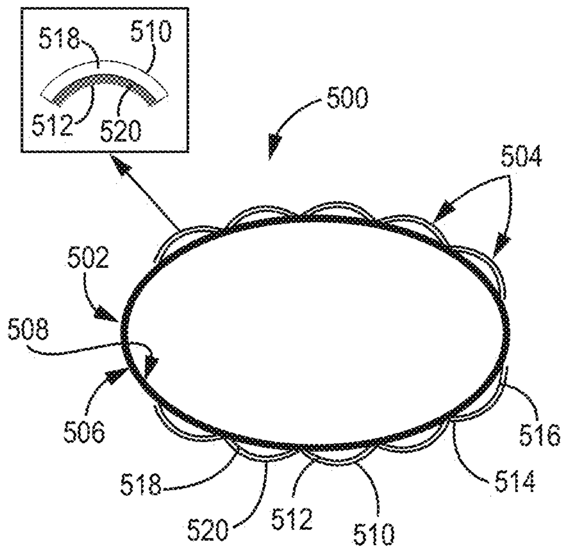
FIG. 6A is a cross-sectional view of a heat exchanger element having deformable surface features with a variable shape.
Figure 6B:
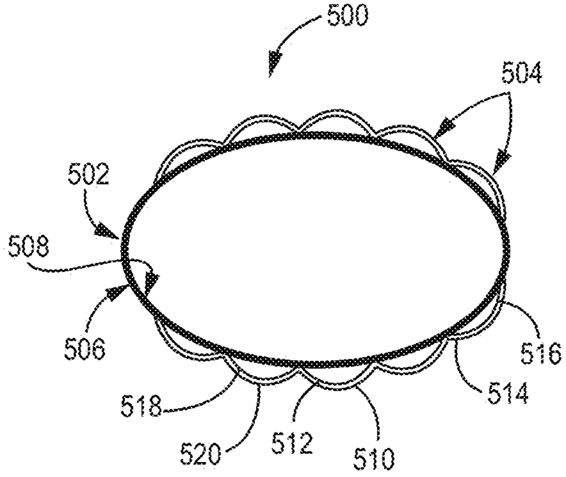
FIG. 6B is a cross-sectional view of the heat exchanger element of FIG. 6A after a temperature change.

FIG. 6A is a cross-sectional view of heat exchanger element 500. Heat exchanger element 500 includes body 502 and surface features 504. Body 502 has an outer body surface 506 and an inner body surface 508. Each surface feature 504 has an outer surface feature surface 510, an inner surface feature surface 512, a first end 514, and a second end 516. FIG. 6B is a cross-sectional view of heat exchanger element 500 after a temperature change. FIGS. 6A-6B will be discussed in turn below.

Each surface feature 504 can be formed of a first material 518 and a second material 520. Surface features 504 are illustrated as having a curved shape in FIGS. 6A-6B, but surface features 504 can have other shapes such as a substantially flat shape (either before or after a temperature change), a shape which conforms to outer body surface 506 (either before or after a temperature change), or other suitable shapes. Each first end 514 of surface features 504 can be attached to outer body surface 506. Each second end 516 of surface features 504 can be attached to outer body surface 506 such that second ends 516 can slidingly engage with outer body surface 506. In some embodiments, each second end 516 can be attached to outer body surface 506 in the same manner as first ends 514. Each surface feature 504 can be formed of a bi-material element, similar to bi-material element 100 (described above in reference to FIG. 2C). These bi-material elements can each be formed of first material 518 and second material 520. First material 518 has a first TEC $C_1$, and second material 520 has a second TEC $C_2$. As described above in reference to FIGS. 2A-2C, first TEC $C_1$ is different than second TEC $C_2$, and in some examples first TEC $C_1$ is less than second TEC $C_2$.

First material 518 and second material 520 can operate in substantially the same way as first material 102 and second material 104 (described above in reference to FIGS. 2A-2C). Due to the difference in thermal expansion between first material 518 and second material 520, the surface area of surface features 504 can change based on temperature.

FIG. 6B shows heat exchanger element 500 following a temperature change. The surface area of surface features 504 has increased due to the difference in TEC of outer surface feature surface 510 and inner surface feature surface 512. Surface features 504 can thereby change surface area based on temperature, and this variance changes the surface area of heat exchanger element 500. In some examples, a shape-memory alloy can be used in place of first and second materials with differing TEC values. It should be understood that the surface area variance of surface features 504 can depend on the choice of material(s) and the temperatures experienced.

In a similar manner to body 304 (described above in reference to FIGS. 4A-4B), the surface area variance of surface features 504 increases the surface area of heat exchanger element 500 and can thereby help to increase the amount of heat exchanged by heat exchanger element 500 during operation.

Figure 7:
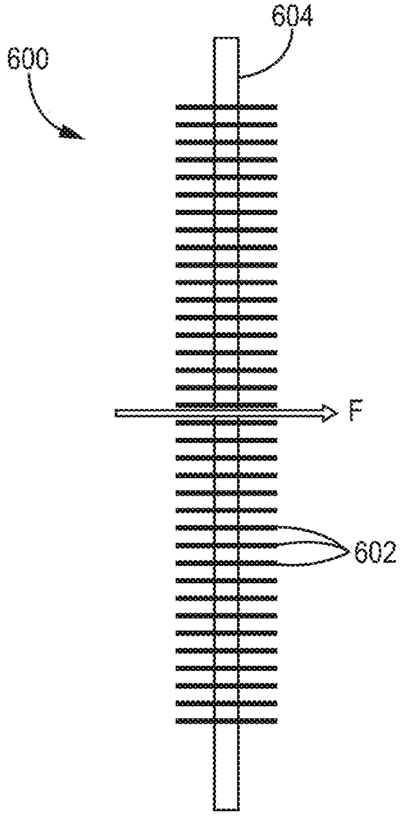
FIG. 7 is a schematic depiction of a heat exchanger.

FIG. 7 is a schematic depiction of heat exchanger 600. Heat exchanger 600 includes heat exchanger elements 602 and header 604. Arrow F shows the direction of a fluid flow through heat exchanger 600.

Heat exchanger 600 can transfer heat between two fluid flows, one which is represented by arrow F and one which can flow through heat exchanger elements 602. Header 604, similar to header 14 described above in reference to FIG. 1, can be attached to each of heat exchanger elements 602. While each of heat exchanger elements 602 is illustrated as being approximately centered with respect to header 604 and oriented such that header 604 is perpendicular to heat exchanger elements 602, heat exchanger elements 602 can attach to header 604 at either end or be situated off-center to either side, and can be oriented at another suitable angle with respect to header 604.

Heat exchanger elements 602 can be substantially similar to any of heat exchanger elements 200, 300, 400, 500 described above in reference to FIGS. 3A-6B, and can operate in substantially the same way as heat exchanger elements 200, 300, 400, 500. Heat exchanger elements 602 can change shape, surface area, and/or roughness in substantially the same way as heat exchanger elements 200, 300, 400, 500.

A heat exchanger made up of the heat exchanger elements as described herein provides numerous advantages. Incorporating variable shape, surface area, and roughness into a heat exchanger element allows the heat exchanger to increase its efficiency. The use of deformable surface features allows heat exchange efficiency to improve without exceeding weight constraints. These variable characteristics allow a heat exchanger to adjust to a wide variety of operating conditions.

Discussion of Possible Embodiments

The following are non-exclusive descriptions of possible embodiments of the present invention.

An embodiment of a heat exchanger element includes a body and at least one surface feature disposed at an outer body surface of the body. The at least one surface feature is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof.

The heat exchanger element of the preceding paragraph can optionally include, additionally and/or alternatively, any one or more of the following features, configurations, and/or additional components:

A heat exchanger element includes a body and at least one surface feature disposed at an outer body surface of the body. The at least one surface feature is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof.

A further embodiment of the foregoing heat exchanger element, wherein the heat exchanger element comprises a shape-memory alloy.

A further embodiment of any of the foregoing heat exchanger elements, wherein the heat exchanger element comprises a first material and a second material. The first material has a first thermal expansion coefficient. The second material has a second thermal expansion coefficient which is different than the first thermal expansion coefficient.

A further embodiment of any of the foregoing heat exchanger elements, further comprising a plurality of tail fins. Each of the plurality of tail fins comprises a base attached to the outer body surface and a tip extending away from the body.

A further embodiment of any of the foregoing heat exchanger elements, wherein each of the plurality of tail fins comprises an outer fin surface and an inner fin surface. Each of the plurality of outer fin surfaces is approximately continuous with the outer body surface such that the plurality of outer fin surfaces is located away from the plurality of inner fin surfaces. Each of the outer fin surfaces has a first thermal expansion coefficient. Each of the inner fin surfaces has a second thermal expansion coefficient which is greater than the first thermal expansion coefficient.

A further embodiment of any of the foregoing heat exchanger elements, wherein the heat exchanger element is configured to change shape in response to a change in temperature.

A further embodiment of any of the foregoing heat exchanger elements, wherein the heat exchanger element is configured to change surface area in response to a change in temperature.

A further embodiment of any of the foregoing heat exchanger elements, wherein the at least one surface feature comprises a plurality of surface features.

A further embodiment of any of the foregoing heat exchanger elements, wherein each of the plurality of surface features has a fin shape. Each of the plurality of surface features comprises a first end and a second end. Each first end is attached to a body of the heat exchanger element. Each second end is not attached to the body of the heat exchanger element.

A further embodiment of any of the foregoing heat exchanger elements, wherein the plurality of surface features is configured to change surface area in response to a temperature change.

A further embodiment of any of the foregoing heat exchanger elements, wherein each of the plurality of surface features has a curved shape. Each of the plurality of surface features comprises a first end and a second end. Each first end is attached to a body of the heat exchanger element. Each second end is configured to slidingly engage with the body of the heat exchanger element.

A further embodiment of any of the foregoing heat exchanger elements, wherein each of the plurality of surface features is disposed parallel to the cross-sectional plane of the heat exchanger element.

An embodiment of a heat exchanger for an aircraft includes at least one heat exchanger element and at least one header. The at least one heat exchanger element includes a body and at least one surface feature disposed at an outer body surface of the body. The at least one surface feature is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof. The at least one header is attached to an end of the at least one heat exchanger element such that the at least one header is oriented perpendicular to the at least one heat exchanger element.

The heat exchanger of the preceding paragraph can optionally include, additionally and/or alternatively, any one or more of the following features, configurations, and/or additional components:

A heat exchanger for an aircraft includes at least one heat exchanger element and at least one header. The at least one heat exchanger element includes a body and at least one surface feature disposed at an outer body surface of the body. The at least one surface feature is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof. The at least one header is attached to an end of the at least one heat exchanger element such that the at least one header is oriented perpendicular to the at least one heat exchanger element.

An embodiment of a method of manufacturing a heat exchanger for an aircraft includes additively manufacturing at least one heat exchanger element. The at least one heat exchanger element includes a body and at least one surface feature which is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof. At least one header, which is attached to an end of the at least one heat exchanger element, is manufactured.

The method of the preceding paragraph can optionally include, additionally and/or alternatively, any one or more of the following features, configurations, and/or additional components:

A method of manufacturing a heat exchanger for an aircraft includes additively manufacturing at least one heat exchanger element. The at least one heat exchanger element includes a body and at least one surface feature which is deformable. At least one of the body and the at least one surface feature is configured to selectively respond to a temperature change such that a physical characteristic of the heat exchanger element changes in response to a temperature change. The physical characteristic is selected from the group consisting of: a shape of the heat exchanger element, a surface area of the heat exchanger element, a surface roughness of the heat exchanger element, and combinations thereof. At least one header, which is attached to an end of the at least one heat exchanger element, is manufactured.

A further embodiment of the foregoing method, wherein manufacturing the at least one surface feature comprises additively manufacturing a plurality of deformable surface features.

A further embodiment of any of the foregoing methods, wherein manufacturing the heat exchanger comprises using hybrid manufacturing techniques.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger element, comprising:

a body comprising an outer body surface surrounding an inner body surface; and a first tail fin and a second tail fin each comprising:

a base attached to the outer body surface; and a tip extending from the base and away from the body;

wherein each of the body, the first tail fin, and the second tail fin is configured to selectively deform in response to respective temperature changes to alter fluid flow about the heat exchanger element; and wherein the first tail fin and the second tail fin are configured to selectively deform to move away from one another in response to the respective temperature changes.

2. The heat exchanger element of claim 1, wherein:

the heat exchanger element comprises a first material and a second material;

the first material has a first thermal expansion coefficient; and the second material has a second thermal expansion coefficient which is different than the first thermal expansion coefficient.

3. The heat exchanger element of claim 1, wherein:

each of the first tail fin and of the second tail fin comprises an outer fin surface and an inner fin surface, wherein each outer fin surface is continuous with the outer body surface such that the plurality of outer fin surfaces is located away from the plurality of inner fin surfaces;

each outer fin surface has a first thermal expansion coefficient; and each inner fin surface has a second thermal expansion coefficient which is greater than the first thermal expansion coefficient.

4. The heat exchanger of claim 1, further comprising a plurality of surface features.

5. The heat exchanger element of claim 4, wherein the plurality of surface features is configured to change the surface roughness of the heat exchanger element in response to another temperature change.

6. The heat exchanger element of claim 5, wherein:

each of the plurality of surface features has a fin shape;

each of the plurality of surface features comprises a first end and a second end;

each first end is attached to the body of the heat exchanger element; and each second end is not attached to the body of the heat exchanger element.

7. The heat exchanger element of claim 4, wherein the plurality of surface features is configured to change surface area in response to the another temperature change.

8. The heat exchanger element of claim 7, wherein:

each of the plurality of surface features has a curved shape;

each of the plurality of surface features comprises a first end and a second end;

each first end is attached to the body of the heat exchanger element; and each second end is configured to slidingly engage with the body of the heat exchanger element.

9. The heat exchanger element of claim 1, wherein the inner body surface and the outer body surface are each formed from the first material and the second material.

10. The heat exchanger element of claim 1, wherein selective deformation results in a physical characteristic selected from the group consisting of: a shape of the heat exchanger element, a surface area of the heat exchanger element, a surface roughness of the heat exchanger element, and combinations thereof.

11. A heat exchanger element for an aircraft comprising:

a body comprising:

an inner body surface formed from the first material and the second material; and an outer body surface formed from the first material and the second material and surrounding the inner body surface; and at least one surface feature disposed at the outer body surface of the body, wherein the at least one surface feature is deformable; and wherein at least one of the body and the at least one surface feature is configured to selectively respond to respective temperature changes such that a physical characteristic of the heat exchanger element changes in response to the respective temperature changes, the physical characteristic selected from the group consisting of: a shape of the heat exchanger element, a surface area of the heat exchanger element, a surface roughness of the heat exchanger element, and combinations thereof.

12. The heat exchanger element of claim 11, wherein the first material has a first thermal expansion coefficient, and wherein the second material has a second thermal expansion coefficient different from the first thermal expansion coefficient.

13. The heat exchanger element of claim 11, further comprising a plurality of tail fins, wherein each fin of the plurality of tail fins comprises a base attached to the outer body surface and a tip extending away from the body.

14. The heat exchanger element of claim 13, wherein:

each fin of the plurality of tail fins comprises an outer fin surface and an inner fin surface, wherein each outer fin surface is continuous with the outer body surface such that the outer fin surface is located away from the plurality of inner fin surfaces;

each outer fin surface has a first thermal expansion coefficient; and each inner fin surface has a second thermal expansion coefficient which is greater than the first thermal expansion coefficient.

15. The heat exchanger element of claim 11, wherein the heat exchanger element is configured to change shape in response to the respective temperature changes.

16. The heat exchanger element of claim 11, wherein the heat exchanger element is configured to change surface area in response to the respective temperature changes.

17. The heat exchanger element of claim 11, wherein the at least one surface feature comprises a plurality of surface features.

18. The heat exchanger element of claim 17, wherein:

each of the plurality of surface features has a curved shape;

each of the plurality of surface features comprises a first end and a second end;

each first end is attached to the body of the heat exchanger element; and each second end is configured to slidingly engage with the body of the heat exchanger element.

19. The heat exchanger element of claim 17, wherein:

each of the plurality of surface features has a fin shape;

each of the plurality of surface features comprises a first end and a second end;

each first end is attached to the body of the heat exchanger element; and each second end is located away from the heat exchange element.

* * * * *